(12) United States Patent
Lee (10) Patent No.: US 12,444,955 B2
(45) Date of Patent: Oct. 14, 2025

(54) INDIVIDUAL DISCHARGE SYSTEM AND METHOD FOR BATTERY RACKS

(71) Applicant: LG ENERGY SOLUTION, LTD., Seoul (KR)

(72) Inventor: Seung Min Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 710 days.

(21) Appl. No.: 17/772,132

(22) PCT Filed: Jan. 22, 2021

(86) PCT No.: PCT/KR2021/000867
§ 371 (c)(1),
(2) Date: Apr. 26, 2022

(87) PCT Pub. No.: WO2021/157920
PCT Pub. Date: Aug. 12, 2021

(65) Prior Publication Data
US 2022/0376519 A1    Nov. 24, 2022

(30) Foreign Application Priority Data
Feb. 3, 2020 (KR) .................. 10-2020-0012655

(51) Int. Cl.
*H02J 7/00* (2006.01)
(52) U.S. Cl.
CPC ........ *H02J 7/0025* (2020.01); *H02J 7/00036* (2020.01); *H02J 7/00308* (2020.01); *H02J 7/007182* (2020.01)

(58) Field of Classification Search
USPC ................................. 320/134, 136
See application file for complete search history.

(56) References Cited

U.S. PATENT DOCUMENTS

| | | |
|---|---|---|
| 2004/0109274 A1 | 6/2004 | Sato |
| 2009/0009136 A1* | 1/2009 | Heinrich ............. H01M 10/425 320/134 |
| 2009/0010196 A1 | 1/2009 | Bui et al. |
| 2012/0221140 A1 | 8/2012 | Berman et al. |
| 2013/0069429 A1 | 3/2013 | Yang et al. |
| 2013/0088201 A1 | 4/2013 | Iwasawa et al. |
| 2013/0106173 A1 | 5/2013 | Nomura |
| 2013/0181681 A1 | 7/2013 | Mukai et al. |

(Continued)

FOREIGN PATENT DOCUMENTS

| | | |
|---|---|---|
| CN | 103094636 A | 5/2013 |
| CN | 103997114 A | 8/2014 |

(Continued)

OTHER PUBLICATIONS

Office Action dated Oct. 28, 2024 issued in corresponding Korean Patent Application No. 10-2020-0012655.

(Continued)

*Primary Examiner* — Samuel Berhanu
(74) *Attorney, Agent, or Firm* — Morgan, Lewis & Bockius LLP (57) ABSTRACT

The present invention relates to an individual discharging system and method of a battery rack, and more particularly, to an individual discharging system and method of a battery rack capable of individually discharging a battery rack without dependence on an external load.

15 Claims, 5 Drawing Sheets

(56) References Cited

U.S. PATENT DOCUMENTS

| | | |
|---|---|---|
| 2015/0255999 A1 | 9/2015 | Kim et al. |
| 2016/0241052 A1 | 8/2016 | Yang |
| 2018/0231614 A1* | 8/2018 | Vidal .................. G01R 31/396 |
| 2019/0237980 A1 | 8/2019 | Yang |
| 2020/0036219 A1 | 1/2020 | Yoon et al. |
| 2020/0217893 A1 | 7/2020 | Song |

FOREIGN PATENT DOCUMENTS

| | | |
|---|---|---|
| CN | 104901324 A | 9/2015 |
| CN | 106532881 A | 3/2017 |
| JP | 2005295697 A | 10/2005 |
| JP | 2015173569 A | 10/2015 |
| KR | 20040047686 A | 6/2004 |
| KR | 20090101964 A | 9/2009 |
| KR | 20130031203 A | 3/2013 |
| KR | 20150081987 A | 7/2015 |
| KR | 10-1563075 B1 | 10/2015 |
| KR | 10-2016-0099357 A | 8/2016 |
| KR | 20180009569 A | 1/2018 |
| KR | 20180116707 A | 7/2018 |
| KR | 10-2018-0135674 A | 12/2018 |
| KR | 20190069049 A | 6/2019 |
| KR | 20190119407 A | 10/2019 |
| WO | 2011/132311 A1 | 10/2011 |

OTHER PUBLICATIONS

International Search Report and Written Opinion issued in corresponding International Patent Application No. PCTKR2021000867, dated May 4, 2021.

Office Action dated Jun. 5, 2023, issued in corresponding Japanese Patent Application No. 2022-527811.

Extended European Search Report dated Mar. 13, 2023, issued in corresponding European Patent Application No. 21749983.9.

First Office Action dated Mar. 28, 2025, issued in corresponding Chinese Patent Application No. 202180005891.8.

\* cited by examiner

INDIVIDUAL DISCHARGE SYSTEM AND METHOD FOR BATTERY RACKS

TECHNICAL FIELD

The present invention relates to an individual discharging system and method of a battery rack, and more particularly, to an individual discharging system and method of a battery rack capable of individually discharging a battery rack without dependence on an external load.

BACKGROUND ART

As environmental destruction and resource depletion are raised as serious issues, there is a growing interest in energy storage systems (ESS) that store energy and efficiently utilize the stored energy. The energy storage device (ESS) configures a battery module by connecting a plurality of battery cells in series or in parallel for maintaining a driving voltage and efficient energy output, and includes a plurality of battery racks configured by connecting a plurality of battery modules in series or in parallel.

In general, the energy storage device (ESS) is a passive system in which power is discharged during the day when the demand for power is high and charging is performed at night when the demand for power is low by a Power Conditioning System.

In a passive system in which charging/discharging is performed by an external device (ex, PCS) in such a way, if the state of charge (SOC) of the energy storage device (ESS) is charged to the top, or if it is not possible to discharge by the Power Conditioning System (PCS) when it is overcharged, there is a situation in which the high voltage is continuously waiting. Such a situation may act as a cause of safety problems such as a reduction in life of battery cells constituting an energy storage device (ESS) and a swelling phenomenon.

(Patent Document 1) KR10-1563075 B1

DISCLOSURE

Technical Problem

The present invention is to solve the above-described problem, and is to provide an individual discharging system and method for a battery rack that enables individual discharge for each battery rack constituting an energy storage device (ESS) without depending on an external load (device) in a situation where discharge is required.

Technical Solution

According to the present invention, A battery rack individual discharging system that discharges the battery rack individually includes: at least two battery racks connected in parallel; a battery management system (BMS) configured to be provided for each of the battery racks, sequentially determine whether or not a predetermined single discharge condition is satisfied when it is detected that an abnormal situation occurs in the corresponding battery rack, and control the corresponding battery rack to operate independently according to the determination result; and a battery protection unit configured to be provided for each of the battery racks and switch the battery rack from connection with an external load to a connection with an internal load under the control of the battery management system (BMS) so as to perform independently discharge operation by the internal load.

In more detail, the battery protection unit (BPU) includes: a main contactor connected between the battery rack and a DC Link plus (+) terminal connected to an external load to form a main discharge path from the battery rack to the external load; a pre-charge contactor having a pre-charge resistor of a predetermined size connected in series and connected in parallel to the main contactor to form a sub discharge path from the battery rack to the external load; a current sensor connected in series to the main contactor and the pre-charge contactor to sense a magnitude of current flowing from the battery rack through the main discharge path and the sub discharge path; an internal load having one end connected in parallel to the main contactor, and the other end formed with a first terminal connected to a charging path from the external load to the battery rack, and configured to consume current discharged from the battery rack according to a connection state of the first terminal; and a switch located at the first terminal from a second terminal configured on the charging path under a control of the battery management system (BMS) to form a single discharge path from the battery rack to the internal load.

Moreover, the battery management system (BMS) includes: a rack voltage measurement unit configured to measure a voltage of the battery rack at regular intervals; a communication unit configured to connect communication with the battery management system BMS of another battery rack; an abnormal situation detection unit configured to detect whether an abnormal situation requiring discharging of the battery rack occurs based on a rack voltage measured by the rack voltage measurement unit and a rack voltage of other battery racks received through the communication unit; a first discharge condition determination unit configured to determine whether a current battery rack satisfies a first discharge condition among predetermined single discharge conditions when it is detected that an abnormal situation occurs by the abnormal situation detection unit; a second discharge condition determination unit configured to determine whether a current battery rack satisfies a second discharge condition among the predetermined single discharge conditions when the first discharge condition determination unit determines that the first discharge condition is satisfied; a third discharge condition determination unit configured to determine whether a current battery rack satisfies a second third discharge condition among the predetermined single discharge conditions when the second discharge condition determination unit determines that the second discharge condition is satisfied; and a connection state control unit configured to control a connection state of the main contactor, the pre-charge contactor, and a switch so that the battery rack is separated from the external load and connected to the internal load if the third discharge condition determination unit determines that a third discharge condition is satisfied.

Specifically, the first discharge condition determination unit includes: a voltage abnormality detection unit configured to detect whether a rack voltage measured by the rack voltage measurement unit is equal to or higher than a predetermined voltage abnormality reference value and output a voltage abnormality signal indicating that the rack voltage is equal to or higher than the predetermined voltage abnormality reference value; a voltage abnormality duration time measurement unit configured to measure a duration time of a voltage abnormality state from a time point when a voltage abnormality signal is outputted from the voltage abnormality detection unit; and a voltage abnormality continuity determination unit configured to compare whether the duration time of the voltage abnormality state measured by the voltage abnormality duration time measurement unit is equal to or higher than a predetermined duration time reference value, and if the duration time is equal to or higher than the predetermined duration time reference value, output a first satisfaction signal indicating that the current battery rack satisfies the first discharge condition.

In addition, the connection state control unit sequentially controls the pre-charge contactor and the main contactor to be in a closed state, and positions the switch at the second terminal to connect the battery rack with the external load in a first operation mode state in which the battery rack is charged/discharged by the external load.

Furthermore, if the third discharge condition determination unit determines that the third discharge condition is satisfied, the connection state control unit controls both the pre-charge contactor and the main contactor to be in an open state and positions the switch at the first terminal to form a single discharge path to the internal load while separating the battery rack from the external load.

Here, the second discharge condition in the second discharge condition determination unit is a state in which the current battery rack is not charged/discharged by the external load.

Furthermore, the third discharge condition in the third discharge condition determination unit includes a state in which there is no damage to the internal load and there is no fusion of the main contactor and the pre-charge contactor.

According to the present invention, an individual discharge method of a battery rack includes: a communication connection step of connecting communication for data exchange with another battery rack connected in parallel; a first operation mode operation step in which the battery rack is connected to an external load and operates in a first operation mode in which charging/discharging is performed by the external load; a rack voltage measurement step of measuring a voltage of the battery rack at regular intervals; an abnormal situation detection step of detecting whether an abnormal situation requiring discharge occurs in the corresponding battery rack, based on rack voltage data measured in the rack voltage measurement step and rack voltage data of the other battery rack connected to the communication; a single discharge condition satisfaction determination step of determining whether the current battery rack satisfies a predetermined single discharge condition for operating in a second operation mode in which the current battery rack discharges alone by an internal load when it is detected that an abnormal situation occurs in the battery rack in the abnormal situation detection step; and a second operation mode operation step of switching the battery rack to a second operation mode in which the battery rack discharges independently by an internal load if it is determined that the current battery rack satisfies the single discharge condition through the single discharge condition satisfaction determination step.

In detail, the single discharge condition satisfaction determination step includes: a first discharge condition determination step of determining whether the current battery rack satisfies a first discharge condition among predetermined single discharge conditions; a second discharge condition determination step of determining whether the battery rack satisfies a second discharge condition among the predetermined single discharge conditions when it is determined that the first discharge condition is satisfied; and a third discharge condition determination step of determining whether the battery rack satisfies a third discharge condition among the predetermined single discharge conditions when it is determined that the second discharge condition is satisfied.

Here, the first discharge condition determination step includes: a voltage abnormality detection step of detecting whether a rack voltage measured in the rack voltage measurement step is equal to or higher than a predetermined voltage abnormality reference value; a voltage abnormality duration time measurement step of measuring a duration time of a voltage abnormality state from a time point detected in the voltage abnormality detection step; and a voltage abnormality duration determination step of comparing whether the voltage abnormality duration time measured in the voltage abnormality duration time measurement step is equal to or more than a predetermined duration time reference value, and determining that the current battery rack satisfies the first discharge condition among the predetermined single discharge conditions if the voltage abnormality duration time is equal to or higher than the predetermined duration time reference value.

Moreover, the first operation mode operation step controls the pre-charge contactor and the main contactor to be in a closed state to form a sub discharge path and a main discharge path from the battery rack to an external load, and locates the switch at the second terminal to form a charging path from the external load to the battery rack.

In addition, the second operation mode operation step switches the pre-charge contactor and the main contactor to an open state to close the sub discharge path and the main discharge path and separate the battery rack from an external load by placing the switch at the first terminal to form a single discharge path from the battery rack to the internal load.

Moreover, the second discharge condition in the second discharge condition determination step is a state in which the current battery rack has no charge/discharge operation due to an external load.

Furthermore, the third discharge condition in the third discharge condition determination step includes a state in which there is no damage to the internal load and no fusion between the main contactor and the pre-charge contactor.

Advantageous Effects

In the present invention, in a state in which an abnormal situation requiring discharge occurs in a battery rack, abnormal situation can be solved by enabling independent discharge by internal load without dependence on external load so that it is possible to prevent abnormal problems that may occur due to the above abnormal situation.

In addition, it is possible to balance voltage states between parallel connected battery racks through individual discharges of the battery racks, thereby improving the efficiency of the battery rack and the entire system.

MODE FOR INVENTION

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Individual Discharging System of Battery Rack According to Present Invention

Figure 1:
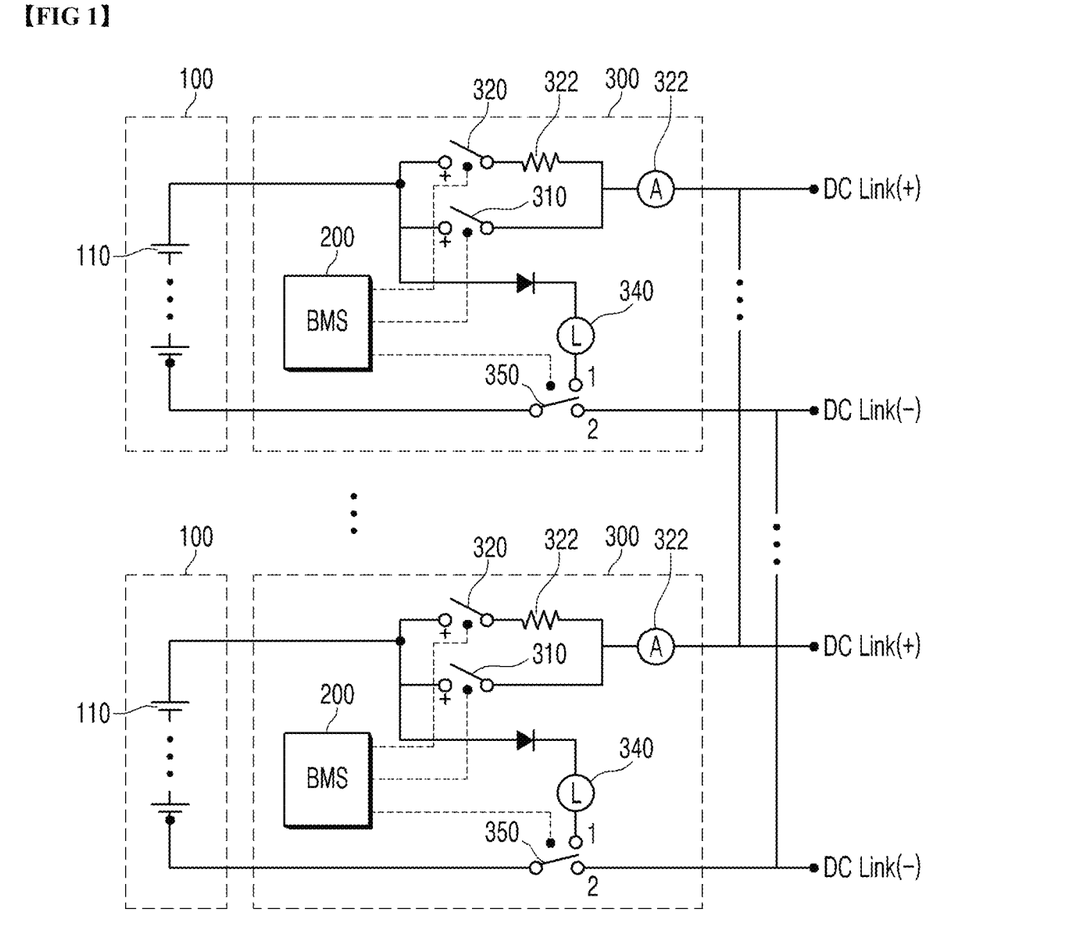
FIG. 1 is a diagram showing the overall configuration of a system according to the present invention.

FIG. 1 is a diagram schematically showing the overall configuration of an individual discharging system of a battery rack according to the present invention. Referring to this, the system according to the present invention enables individual discharge according to the state of the battery rack without dependence on an external load, and may include the following configurations.

1.1. Battery Rack 100

The battery rack may be configured by connecting at least one battery module 110 in series/parallel. The system according to the present invention is configured in a state in which at least two or more battery racks 100 are connected in parallel.

1.2. Battery Management System 200

The battery management system (BMS) is a configuration for controlling a battery protection unit (BPU) to be described later, in which it is provided for each battery rack 100, and when it is detected that an abnormal situation occurs in the corresponding battery rack, by sequentially determining whether a predetermined single discharge condition is satisfied, the independent discharge operation of the battery rack can be performed according to the determination result.

Figure 4:
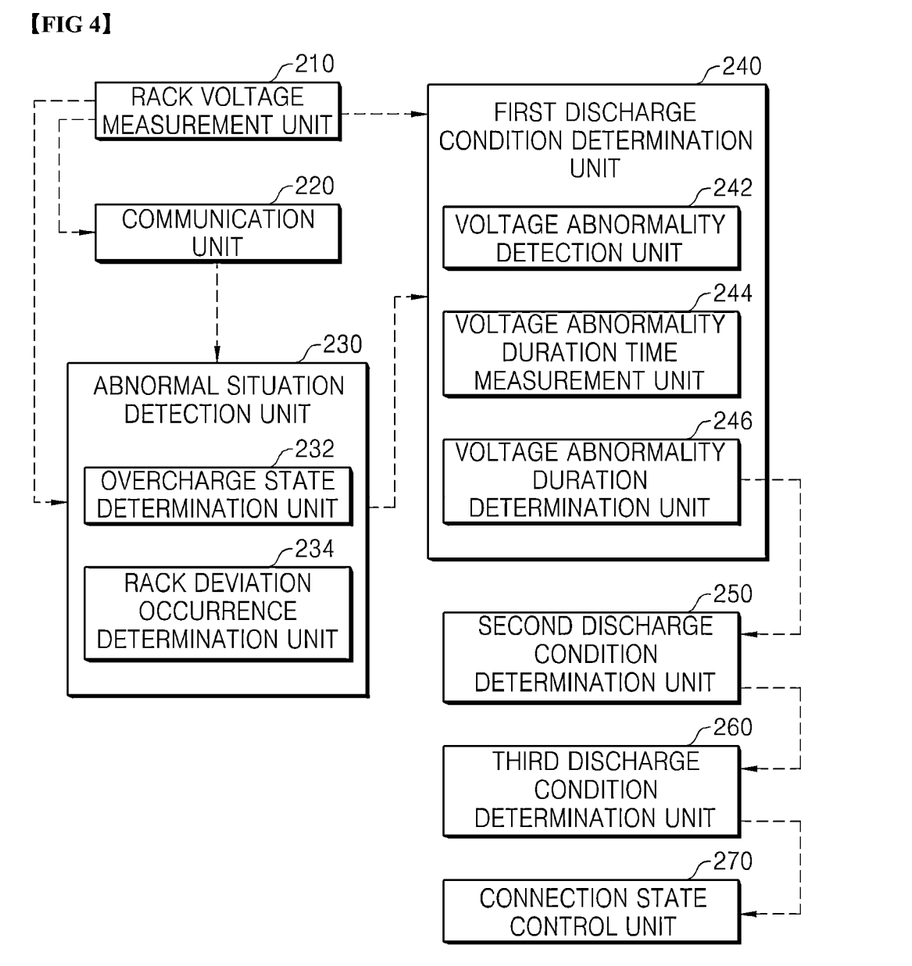
FIG. 4 is a block diagram schematically showing the configuration of a battery management system (BMS) according to the present invention.

Referring to FIG. 4, the battery management system (BMS) according to the present invention may include the following components.

A. Rack Voltage Measurement Unit 210

The rack voltage measurement unit is a component that measures the voltage of the battery rack 100 at regular intervals. For example, it is possible to measure the rack voltage of the battery rack 100 using a known method such as measuring the voltage of the battery modules 110 constituting the battery rack 100 and measuring the rack voltage based on these.

B. Communication Unit 220

The communication unit is a configuration for connecting communication with the battery management system 200 of other battery racks 100, and may transmit the rack voltage data of the battery rack 100 to the battery management system (BMS) 200 of the battery rack 100 through the communication unit 220, and receive the rack voltage data of the other battery racks 100.

C. Abnormal Situation Detection Unit 230

The abnormal situation detection unit is a configuration in which whether an abnormal situation occurs in the battery rack 100 is detect based on the rack voltage data of the battery rack measured by the rack voltage measurement unit 210 and the rack voltage data of other battery racks obtained through the communication unit 220, and may be configured including the following detailed configuration.

Here, the abnormal situation means a situation in which the battery rack needs to be discharged, including an overcharge state of the battery rack and a state of deviation between battery racks.

A) Overcharge State Determination Unit 232

The overcharge state determination unit may compare the rack voltage measured by the rack voltage measurement unit 210 with a predetermined overcharge reference value and determine whether the battery rack is in an overcharge state according to the comparison result.

As a result of comparison, when the rack voltage of the battery rack is more than a predetermined overcharge reference value, it is determined that the battery rack is in an overcharge state, and an overcharge state signal indicating this may be outputted.

On the other hand, when the rack voltage of the battery rack is less than a predetermined overcharge reference value, it is not determined that the battery rack is in an overcharge state.

B) Rack Deviation Occurrence Determination Unit 234

The rack deviation occurrence determination unit may compare the rack voltage of each battery rack measured by the rack voltage measurement unit 210 with the rack voltage of other battery racks received through the communication unit 220 and may determine whether the battery rack is in a higher voltage state than other battery racks according to the comparison result.

As a result of comparison, if the rack voltage of this battery rack is more than a predetermined deviation standard value than the rack voltage of other battery racks, since the rack voltage of this battery rack is higher than that of other battery racks, it is determined that it is a rack deviation occurrence that requires discharge and a rack deviation occurrence signal indicating this can be outputted.

On the other hand, if the rack voltage of this battery rack has a difference between the rack voltage of other battery racks and a predetermined deviation standard value, it is not determined as a rack deviation occurrence state.

On the other hand, it is possible to additionally configure the criteria for determining the occurrence of an abnormal situation in the battery rack if it can be determined that the battery rack needs to be discharged, such as whether or not swelling of the cell occurs, in addition to the overcharge state of the battery rack and the deviation between battery racks as described above.

D. First Discharge Condition Determination Unit 240

The first discharge condition determination unit is a configuration in which if either of the overcharge state signal and the rack deviation occurrence signal are outputted from the abnormal situation detection unit 230, it is determined that the current battery rack 100 needs to be discharged and whether the battery rack satisfies the first discharge condition among predetermined single discharge conditions is determined, and can be configured including the following detailed configuration.

A) Voltage Abnormality Detection Unit 242

The voltage abnormality detection unit may detect whether the rack voltage measured by the rack voltage measurement unit 210 is above a predetermined voltage abnormality reference value and in case of abnormality, output the voltage abnormality signal indicating this.

B) Voltage Abnormality Duration Time Measurement Unit 244

When a voltage abnormality signal is outputted from the voltage abnormality detection unit 242, the voltage abnormality duration time detection unit may measure a duration of a voltage abnormality state from the output point.

C) Voltage Abnormality Duration Determination Unit 246

The voltage abnormality duration determination unit may compare whether the duration time of the voltage abnormality state measured by the voltage abnormality duration time measurement unit 244 is more than a predetermined duration time reference value, and in case of abnormality, output a first satisfaction signal indicating this.

The output of the first satisfactory signal indicates that the current battery rack satisfies the first discharge condition among single discharge conditions, which are conditions for determining whether independent discharge is required, and when the first satisfactory signal is outputted, the second discharge condition determination unit 250 to be described later performs an operation of determining whether the second discharge condition is satisfied.

E. Second Discharge Condition Determination Unit 250

As described above, when the first satisfaction signal is outputted from the first discharge condition determination unit 240, the second discharge condition determination unit performs an operation of determining whether the current battery rack satisfies a second discharge condition among single discharge conditions.

The second discharge condition determination unit may check whether the battery rack is currently in charge/discharge operation by an external load to determine whether or not the second discharge condition is satisfied.

That is, the second discharge condition is a state in which the battery rack is not used by an external load, and this is determined as a charging/discharging operation state. The method of determining whether the battery rack is charged/discharged by an external load may be determined by whether or not current flows in the charging/discharge path a, b, and c between the battery rack 100 and the external load, and in addition, a known method for determining whether charging/discharging operation by an external load can be used can be used.

Here, the external load is a device that supplies power to battery racks connected in parallel as needed, or uses stored power, and may be, for example, a Power Conditioning System (PCS).

If it is determined that the current battery rack 100 has no charging/discharging operation due to an external load, the second discharge condition determination unit outputs a second satisfaction signal indicating that the second discharge condition is satisfied among single discharge conditions, which are conditions for determining whether the battery rack needs to be discharged alone.

F. Third Discharge Condition Determination Unit 260

The third discharge condition determination unit is a configuration for determining whether a third discharge condition is satisfied among single discharge conditions, which are conditions for determining whether a battery rack needs to be discharged alone, and this performs the operation when a second satisfaction signal is outputted from the second discharge condition determination unit 250.

The third discharge condition may be set as a state in which there is no damage to the internal load 340 configured in the battery protection unit (BPU) 300 to be described later, and a state in which there is no fusion of the main contactor 310 and the pre-charge contactor 320. Here, the fact that the contactors 310 and 320 are in a fusion state is a state in which both contacts of the contactor are fixed, and refers to a state in which both contacts of the contactors 310 and 320 are in contact regardless of a control signal for controlling the open/close state of the contactors 310 and 320.

Accordingly, the third discharge condition determination unit 260 may determine whether the internal load 340 is damaged and whether the contactors 310 and 320 are fused to determine whether the current battery rack 100 satisfies the third discharge condition.

The method of determining whether the internal load is damaged and whether the contactor is damaged, which is the third discharge condition, can be divided into two cases.

<Case 1: When there is Signal about Damage to Battery Protection Unit Itself>

In case 1, determining whether the internal load 340 is damaged may be determined by whether a failure signal of the internal load 340 itself is generated. in this case, the internal load 340 is composed of an active element capable of giving a signal to notify the occurrence of a failure by itself, and determines whether it is damaged or not, so that when it is determined that there is damage, a fault signal indicating this can be outputted. Accordingly, it may be determined whether the internal load 340 is damaged according to whether a fault signal is generated from the internal load 340.

In addition, determining whether the contactor is fused may be made based on whether the state of controlling the open/close of the main contactor 310 and the pre-charge contactor 320 in the connection state control unit 270 to be described later and the current open/closed state of the main contactor 310 and the pre-charge contactors 310 and 320 are matched.

For example, the connection state control unit 270 controls the main contactor 310 to an open state, and when the current main contactor 310 is in a closed state, since the control state of the actual main contactor 310 is different from the control state in the connection state control unit 270, in this case, it is determined that the contactor is in a fused state.

<Case 2: When there is No Signal of Damage to Battery Protection Unit Itself>

In case 2, it may be determined whether the internal load 340 is damaged and whether the contactors 310 and 320 are fused based on whether the current discharged from the battery rack 100 flows.

For example, in a state in which the connection state control unit 270 controls the contactors 310 and 320 in an open state and controls the battery rack 100 and the internal load 340 to be connected by placing the switch 350 at the first terminal, if the current value measured by the current sensor 330 configured between the contactors 310 and 320 and the DC Link plus (+) terminal is more than a predetermined reference current value, this may be determined as damage to the internal load 340 and a fusion state of the contactors 310 and 320. The reason is that when the switch 350 is located at the first terminal so that the battery rack 100 and the internal load 340 are connected, and the contactors 310 and 320 are controlled in an open state, the discharge path to the external load by the main contactor 310 and the pre-charge contactor 320 is not formed, and the current discharged from the battery rack 100 flows into a single discharge path formed by the internal load 340. However, the fact that the current value measured by the current sensor 330 configured between the contactors 310 and 320 and the DC Link plus (+) terminal connected to the external load is greater than or equal to a predetermined reference current value refers to the fact that the current from the battery rack 100 does not properly flow to the single discharge path by the internal load 340, but flows to the main/sub discharge path by the main contactor 310 and pre-charge contactor 320, so that when such a state is detected, it is determined that the internal load 340 is damaged and the contactors 310 and 330 are fused. If it is determined that there is no damage to the internal load 340 and there is no fusion of the contactors 310 and 320 through the same method as described above, the third discharge condition determination unit 260 may output a third satisfaction signal indicating this.

Meanwhile, In addition to internal load damage and contactor fusion, if it is an item that can monitor the state of the battery protection unit (BPU) according to the characteristics of the system, the third discharge condition may include the item additionally and may be configured.

G. Connection State Control Unit 270

The connection state control unit controls the open/close state of the main contactor 310 and the pre-charge contactor 320 to be described later, and the switching operation of the switch 350, respectively, according to the determination result of the third discharge condition determination unit 260 and thus, the battery rack 100 may be connected to the internal load 340 while separating the battery rack 100 from the external load so that an independent discharge operation by the internal load may be performed.

Figure 3:
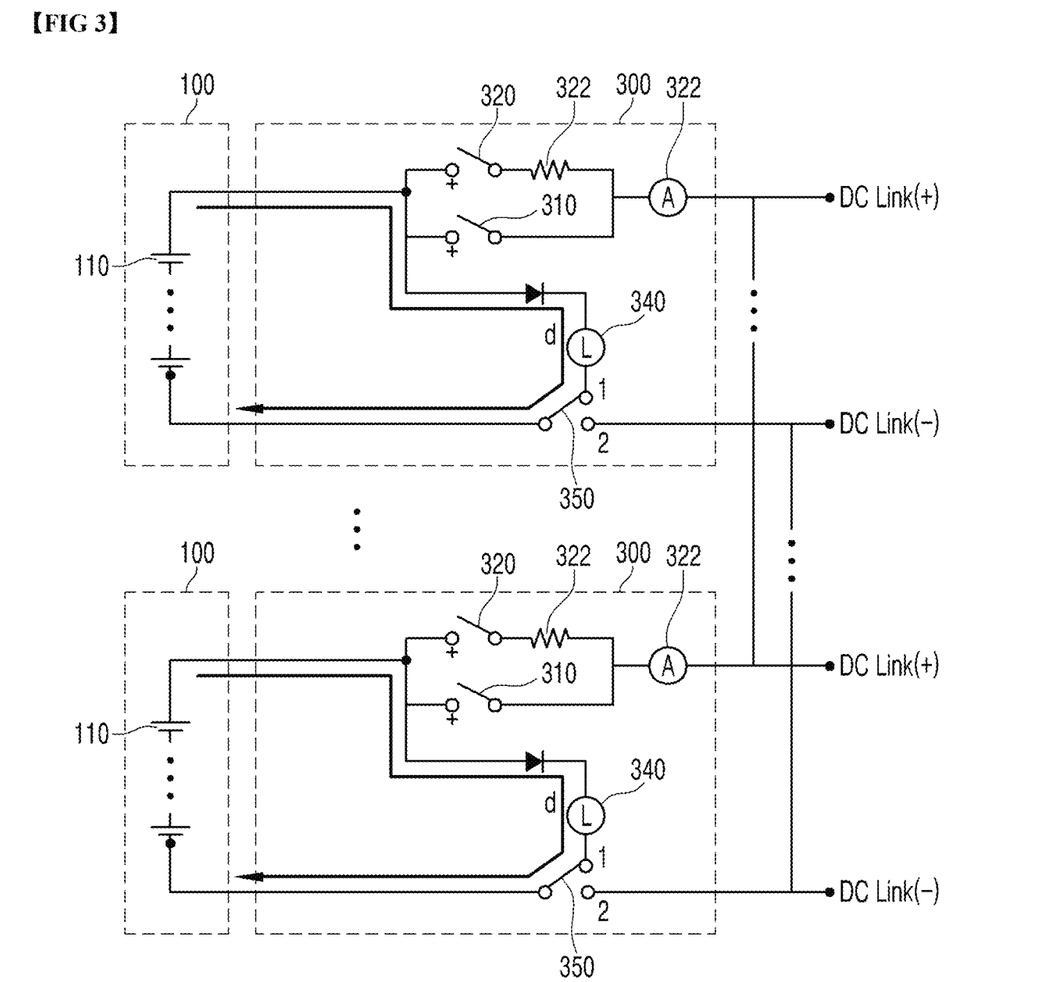
FIG. 3 is a view showing a state in which the battery rack operates in a second operation mode discharged by an internal load.

Specifically, when a third satisfaction signal is outputted from the third discharge condition determination unit 260, the connection state control unit 270 may separate the battery rack 100 from the external load by controlling both the main contactor 310 and the pre-charge contactor 320 in a closed state, and connect the battery rack 100 with the internal load by switching the switch 350 to be described later to be positioned at the first terminal, which is one end of the internal load 340. With this control, as shown in FIG. 3, in a state in which the battery rack 100 is separated from an external load, a single discharge path d with the internal load 340 is formed, so that the independent discharge operation of only the battery rack 100 is performed by the internal load 340 without depending on the external load.

The fact that the third satisfaction signal is outputted from the third discharge condition determination unit 260 means that after the abnormal situation detection unit 230 detects that an abnormal situation occurs in the battery rack 100, the first, second and third discharge condition determination units 240, 250, 260 sequentially determine whether the first, second and third discharge conditions of a predetermined single discharge condition are satisfied, and all of these discharge conditions are satisfied.

Therefore, when the third satisfaction signal is outputted from the third discharge condition determination unit 260, the connection state control unit 270 determines that the current battery rack 100 is in a state in which an independent discharge operation should be performed and as described above, controls the main contactor 310, the pre-charge contactor 320, and the switch 350, respectively, to separate the battery rack 100 from the external load and connect it to the internal load 340, so that this is to allow the battery rack to operate independently of the internal load 340 without depending on the external load.

On the other hand, if the third satisfaction signal is not outputted from the third discharge condition determination unit 260, the connection state control unit 270 controls the pre-charge contactor 320 and the main contactor 310 in a sequentially closed state, and locates the switch 350 in the second terminal configured on the charging path c, which is a connection path between the battery rack 100 and the DC Link negative (−) terminal connected to the external load, so that a general charge/discharge operation for forming a charge/discharge path between the battery rack 100 and an external load is performed.

1.3. Battery Protection Unit 300

The battery protection unit (BPU) is provided for each battery rack 100, and is a configuration in which by switching the connection state between the battery rack and the internal/external load under the control of the battery management system (BMS) 200, the battery rack is switched to operate in a first operation mode discharging by an external load or a second operation mode discharging by an internal load, and the following configuration may be included.

A. Main Contactor 310

The main contactor is connected between the battery rack 100 and a DC Link plus (+) terminal connected to an external load, and forms a main discharge path a from the battery rack 100 to an external load.

Figure 2:
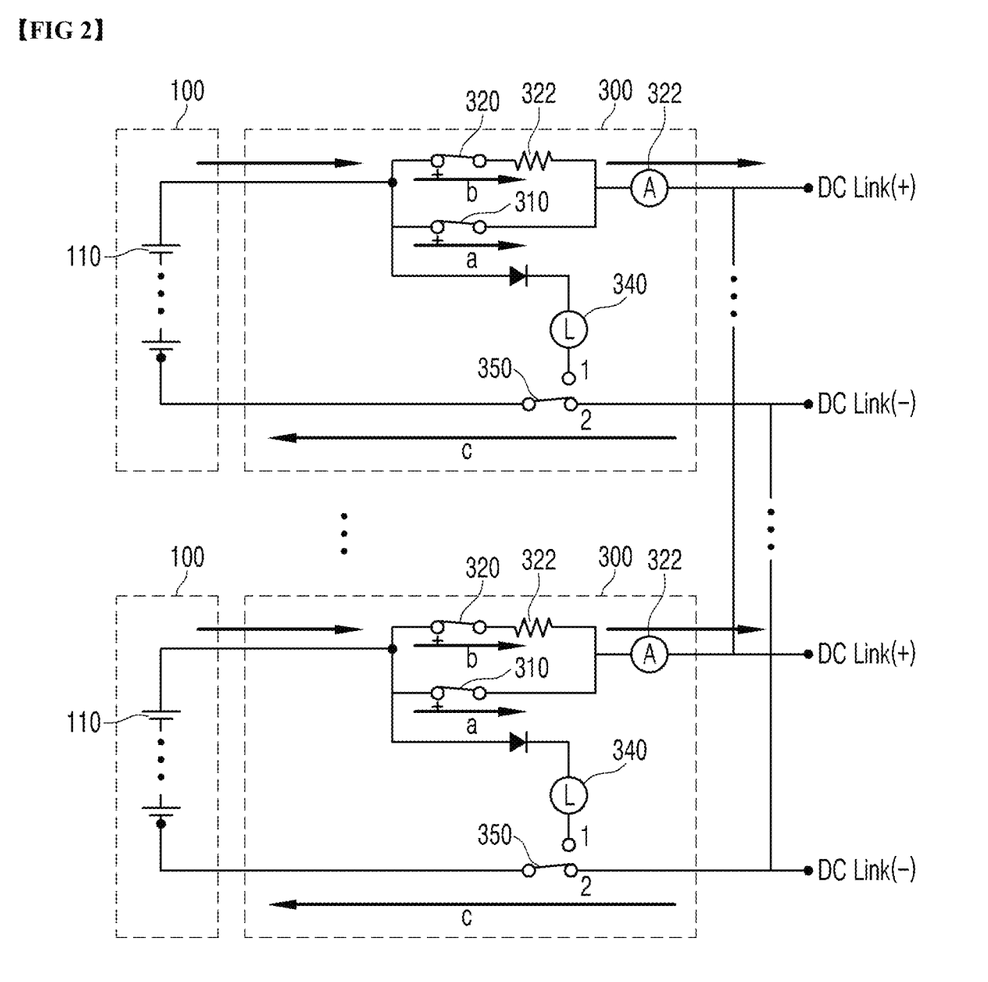
FIG. 2 is a diagram illustrating a state in which the battery rack operates in a first operation mode in which charging/discharging by an external load is performed.

In such a way, when opened by the control of the connection state control unit 270 of the battery management system (BMS) 200, as shown in FIG. 2, the main contactor 310 forms a main discharge path a from the battery rack 100 to an external load to connect the battery rack 100 and the DC Link plus (+) terminal, that is, connect the battery rack 100 and the external load.

On the other hand, when it is closed by the control of the connection state control unit 270 of the battery management system (BMS) 200, as shown in FIG. 3, the main discharge path a from the battery rack 100 to an external load is closed.

B. Pre-Charge Contactor 320

The pre-charge contactor is connected in parallel to the main contactor 310 to form a sub discharge path b from the battery rack 100 to an external load. At this time, the pre-charge resistor 322 having a predetermined size is connected in series to the pre-charge contactor 320, so that the magnitude of the discharge current flowing through the sub discharge path b can be adjusted.

In such a way, when opened by the control of the connection state control unit 270 of the battery management system (BMS) 200, as shown in FIG. 2, the pre-charge contactor 320 forms a sub discharge path b from the battery rack 100 to an external load to connect the battery rack 100 and the DC Link plus (+) terminal, that is, connect the battery rack 100 and the external load.

On the other hand, when it is closed by the control of the connection state control unit 270 of the battery management system (BMS) 200, as shown in FIG. 3, the sub discharge path b from the battery rack 100 to an external load is closed.

As described above, when both the main contactor 310 and the pre-charge contactor 320 are controlled to be closed, the main discharge path a and the sub discharge path b from the battery rack 100 to the external load are closed to separate the battery rack 100 from the external load.

C. Current Sensor 330

The current sensor is connected in series to the main contactor 310 and the pre-charge contactor 320, and senses the magnitude of the current flowing from the battery rack 100 through the main discharge path a and the sub discharge path b.

D. Internal Load 340

The internal load is connected in parallel to the main contactor 310 and is configured not to be connected to a DC Link plus (+) terminal connected to an external load. When a single discharge path d passing through the internal load 340 formed by the control of the battery management system (BMS) 200 is formed, the internal load 340 may consume a discharge current flowing from the battery rack 100 to the single discharge path d.

For example, when the switch 350 to be described later is positioned at the first terminal, which is one end of the internal load 340, by the control of the connection state control unit 270 of the battery management system (BMS) 200, as shown in FIG. 3, the single discharge path d from the battery rack 100 to the internal load 340 is formed, so that the internal load 340 consumes a discharge current flowing through the single discharge path d.

On the other hand, when the switch 350 to be described later is located at the second terminal configured in the connection path between the battery rack 100 and the DC Link minus (−) terminal connected to an external load by the control of the connection state control unit 270 of the battery management system (BMS) 200, as shown in FIG. 2, the single discharge path d from the battery rack 100 to the internal load 340 is not formed.

As such, the present invention configures an internal load 340 capable of consuming energy of the battery modules 110 constituting the battery rack 100 in the battery protection unit (BPU) 300, so that the battery rack 100 alone can perform discharging without depending on an external load.

Meanwhile, the internal load 340 refers to an arbitrary device capable of consuming energy of the battery rack.

E. Switch 350

The switch is configured to switch the connection state to connect the battery rack 100 and an external load or to connect the battery rack 100 and an internal load 340.

More specifically, according to the control of the connection state control unit 270 of the battery management system (BMS) 200, the switch 350 is located at the first terminal which is one end of the internal load 340 or at the second terminal configured in the connection path between the battery rack 100 and the DC Link minus (−) terminal connected to the external load to switch the connection between the battery rack 100 and the internal load 340 and an external load.

For example, when the switch 350 is located at the first terminal, as shown in FIG. 3, by forming the single discharge path d from the battery rack 100 to the internal load 340, current discharged from the battery modules 110 constituting the battery rack 100 is consumed by the internal load 340.

On the other hand, when the switch 350 is positioned at the second terminal, the single discharge path d from the battery rack 100 to the internal load 340 is not formed as shown in FIG. 2.

In this way, the present invention configures the internal load 340, which is an arbitrary device that consumes energy of the battery rack 100 in the battery protection unit (BPU) 300 provided for each battery rack, and when the battery rack satisfies a predetermined single discharge condition while an abnormal situation that requires discharge of the battery rack occurs, is configured to perform an independent discharge operation using the internal load 340 by connecting the battery rack 100 to the internal load 340 while separating the battery rack 100 from the external load. Accordingly, when an abnormal situation occurs in the battery rack, discharge by the internal load occurs without depending on the external load. Therefore, it is possible to prevent the occurrence of various problems due to the abnormal situation. In addition, it is possible to balance the voltage state between the battery racks by solving the occurrence of voltage deviation between the battery racks connected in parallel through this, so that it is efficient for battery rack and system operation.

2. Individual Discharge Method of Battery Rack According to Present Invention

Figure 5:
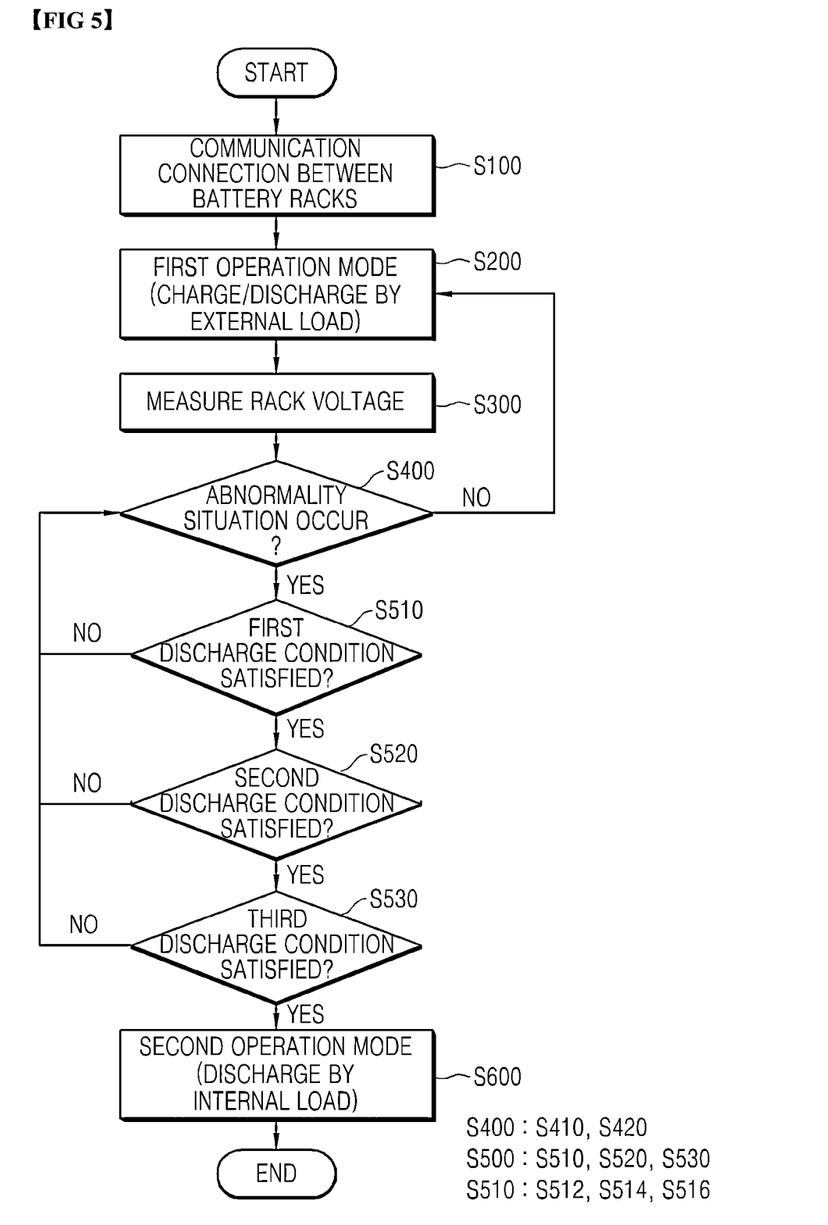
FIG. 5 is a flowchart schematically showing a method of discharging an individual battery rack according to the present invention.

FIG. 5 is a flowchart showing a method of discharging an individual battery rack according to the present invention. Referring to this, a process in which the battery rack operates independently discharged by an internal load without dependence on an external load will be described.

Here, for convenience of explanation, the general operation of charging/discharging the battery rack to an external load is referred to as a first operation mode, and an operation of discharging by the internal load 340 provided in the battery protection unit (BPU) 300 is referred to as a second operation mode.

2.1. Communication Connection Step S100

The communication connection step is a step of connecting communication between at least one battery rack 100 connected in parallel, and specifically, it may be communicatively connected with other battery racks 100 through the communication unit 220 of a battery management system (BMS) provided for each battery rack 100.

Through this communication connection, rack voltage data measured in a rack voltage measurement step S300 to be described later can be exchanged with other battery racks 100.

2.2. First Operation Mode Operation Step S200

The first operation mode operation step is a step in which the battery rack 100 performs a general operation of charging/discharging by an external load.

The fact that the battery rack is connected to an external load and operates in a first operation mode in which a charging/discharging operation is performed by the external load is that the connection state control unit 270 of the battery management system (BMS) 200 controls to sequentially close the pre-charge contactor 320 and the main contactor 310 configured in the battery protection unit (BPU) 300 so as to form the sub discharge path b and the main discharge path a from the battery rack 100 to an external load and place the switch 350 on the second terminal configured on the connection path between the battery rack 100 and the DC Link negative (−) terminal connected to the external load so that it forms a charging path and is connected to an external load. In this case, as shown in FIG. 2, the battery rack 100 may be charged/discharged by an external load through the main discharge path a, the sub discharge path b, and the charging path c.

2.3. Rack Voltage Measurement Step S300

The rack voltage measurement step is a step of measuring the voltage of the battery rack 100 at regular intervals, and may be performed by the rack voltage measurement unit 210 of the battery management system (BMS) 200.

Measuring the rack voltage, for example, may measure the voltage of the battery modules 110 constituting the battery rack 100, and measure a rack voltage based on the measured module voltages using a known method.

2.4. Abnormal Situation Detection Step S400

The abnormal situation detection step is a step of detecting whether an abnormal situation occurs in the battery rack 100 based on the rack voltage data measured in the rack voltage measurement step S300 and the rack voltage data of the other battery racks 100 connected to the communication.

Here, the abnormal situation means a situation in which the battery rack needs to be discharged, including an overcharge state of the battery rack and a state of deviation between battery racks.

The step of detecting such an abnormal situation may include detailed steps as follows.

A. Overcharge State Determination Step S410

The overcharge state determination step may compare the rack voltage measured in the rack voltage measurement step S300 with a predetermined overcharge reference value, and determine whether the current battery rack is in an overcharge state according to the comparison result.

As a result of comparison, when the rack voltage of the battery rack is more than a predetermined overcharge reference value, it is determined that the current battery rack is in an overcharge state, and an overcharge state signal indicating this may be outputted.

On the other hand, if the rack voltage of the battery rack is less than a predetermined overcharge reference value, it is not determined that the current battery rack is in an overcharge state.

This step is performed by the overcharge state determination unit 232 of the abnormal situation detection unit 230 described above.

B. Rack Deviation Occurrence Determination Step S420

The rack deviation occurrence determination step may compare the rack voltage of each battery rack measured in the rack voltage measurement step S300 and the rack voltage of another battery rack that is communicatively connected through the communication connection step S100, and determine whether the battery rack is in a higher voltage state than other battery racks according to the comparison result.

As a result of comparison, if the rack voltage of this battery rack is more than a predetermined deviation standard value than the rack voltage of other battery racks, since the rack voltage of this battery rack is higher than that of other battery racks, it is determined that it is a rack deviation occurrence that requires discharge and a rack deviation occurrence signal indicating this can be outputted.

On the other hand, if the rack voltage of this battery rack has a difference between the rack voltage of other battery racks and a predetermined deviation standard value, it is not determined as a rack deviation occurrence state.

This step is performed by the rack deviation occurrence determination unit 234 of the abnormal situation detection unit 230 described above.

On the other hand, the criterion for determining the occurrence of an abnormal situation in the battery rack does not limit only the overcharge state of the battery rack and the state of deviation between the battery racks as described above, and in addition, may be configured additionally if it can be determined that the battery rack needs to be discharged, such as whether or not swelling of the cell occurs according to the characteristics of the system.

On the other hand, in this step, if it is determined that the battery rack 100 is not in an overcharge state and is not in a rack deviation occurrence state with another battery rack, it is determined that the current battery rack 100 is not an abnormal situation requiring discharge and it returns to the first operation mode operation step S200 and maintains a state in which charging/discharging is operated by an external load.

2.5. Single Discharge Condition Satisfaction Determination Step S500

If either of the overcharge state signal and the rack deviation occurrence signal is outputted in the abnormal situation detection step, the single discharge condition satisfaction determination step is a step of recognizing that the current battery rack 100 is in a state in which an abnormal situation requiring discharge occurs, and determining whether a predetermined single discharge condition for operating in a second operation mode in which discharges are performed alone by an internal load without dependence on an external load is satisfied in the first operation mode charging/discharging by an external load.

Such a single discharge condition satisfaction determination step may include the following steps.

A. First Discharge Condition Determination Step S510

The first discharge condition determination step is a step of determining whether the voltage of the current battery rack 100 is above a reference value and continues for a reference time or longer.

A) Voltage Abnormality Detection Step S512

It detects whether the rack voltage measured in the rack voltage measurement step S300 is higher than a predetermined voltage abnormality reference value, and if it is higher, outputs a voltage abnormality signal indicating the high (voltage abnormality detection unit 242).

B) Voltage Abnormality Duration Time Measurement Step S514

When a voltage abnormality signal is outputted in the voltage abnormality detection step S512, a time during which the voltage abnormality state continues from the output time point is measured (voltage abnormality duration time measurement unit 244).

C) Voltage Abnormality Duration Determination Step S516

The voltage abnormality duration determination step compares whether the duration of the battery rack in the voltage abnormality state measured in the voltage abnormality duration time measurement step S514 is greater than or equal to a predetermined duration time reference value, and if it is higher, a first satisfaction signal indicating this may be outputted (voltage abnormality duration determination unit 246).

The output of the first satisfactory signal indicates that the current battery rack satisfies the first discharge condition among single discharge conditions, which are conditions for determining whether independent discharge is required, and when the first satisfactory signal is outputted, a second discharge condition determination step S520, which will be described later, is performed.

On the other hand, if it is determined that the current battery rack 100 does not meet the first discharge condition, it returns to the abnormal situation detection step S400.

B. Second Discharge Condition Determination Step S520

In the second discharge condition determination step, it is reported that the current battery rack satisfies the first discharge condition among single discharge conditions when the first satisfaction signal is outputted through the first discharge condition determination step S510, and it can be determined whether or not the second discharge condition is satisfied.

The second discharge condition determination step is to check whether the battery rack is currently in charge/discharge operation by an external load, that is, a state in which there is use by an external load, and determine that the second discharge condition is satisfied if the current battery rack is not used by an external load.

This may be determined based on whether the current battery rack is in a charging/discharging operation state. The method of determining whether the battery rack is charged/discharged by an external load may be determined, for example, based on whether current flows on the main discharge path a, the sub discharge path b, and the charging path c, which are charging/discharge paths with an external load, and in addition, a known method for determining whether charging/discharging operation by an external load can be used can be used.

As a result, if it is determined that the current battery rack 100 is in a state in which there is no charging/discharging operation due to an external load, a second satisfactory signal indicating that the second discharge condition is satisfied among the single discharge conditions that are conditions for determining whether the battery rack needs to be discharged alone may be outputted (second discharge condition determination unit 250).

On the other hand, if it is determined that the current battery rack 100 does not meet the second discharge condition, it returns to the abnormal situation detection step S400.

C. Third Discharge Condition Determination Step S530

In the third discharge condition determination step, it is reported that the current battery rack satisfies the second discharge condition among single discharge conditions when the second satisfaction signal is outputted through the second discharge condition determination step S520, and it can be determined whether or not the third discharge condition is satisfied.

The third discharge condition may be set as a state in which there is no damage to the internal load 340 configured in the battery protection unit (BPU) 300, and a state in which there is no fusion of the main contactor 310 and the pre-charge contactor 320.

Therefore, in the third discharge condition determination step, by checking whether the internal load 340 is damaged and whether the contactors 310 and 320 are damaged, it may be determined whether the current battery rack 100 satisfies the third discharge condition.

The method of determining whether the internal load is damaged and whether the contactor is damaged, which is the third discharge condition, can be divided into two cases.

<Case 1: When there is Signal about Damage to Battery Protection Unit Itself>

In case 1, determining whether the internal load 340 is damaged may be determined by whether a failure signal of the internal load 340 itself is generated.

In addition, determining whether the contactor is fused may be determined based on whether the state of controlling the open/close of the main contactor 310 and the pre-charge contactor 320 in the connection state control unit 270 of the battery management system (BMS) 200 and the current open/closed state of the main contactor 310 and the pre-charge contactor 320 are matched.

For example, the connection state control unit 270 controls the main contactor 310 to an open state, and when the current main contactor 310 is in a closed state, since the control state of the actual main contactor 310 is different from the control state in the connection state control unit 270, in this case, it is determined that the contactor is in a fused state.

<Case 2: When there is No Signal of Damage to Battery Protection Unit Itself>

In case 2, it may be determined whether the internal load 340 is damaged and whether the contactors 310 and 320 are fused based on whether the current discharged from the battery rack 100 flows.

For example, in a state in which the connection state control unit 270 controls the contactors 310 and 320 in an open state and controls the battery rack 100 and the internal load 340 to be connected by placing the switch 350 at the first terminal, if the current value measured by the current sensor 330 configured between the contactors 310 and 320 and the DC Link plus (+) terminal is more than a predetermined reference current value, this may be determined as damage to the internal load 340 and a fusion state of the contactors 310 and 320. The reason is that when the switch 350 is located at the first terminal so that the battery rack 100 and the internal load 340 are connected, and the contactors 310 and 320 are controlled in an open state, the discharge path to the external load by the main contactor 310 and the pre-charge contactor 320 is not formed, and the current discharged from the battery rack 100 flows into a single discharge path formed by the internal load 340. However, the fact that the current value measured by the current sensor 330 configured between the contactors 310 and 320 and the DC Link plus (+) terminal connected to the external load is greater than or equal to a predetermined reference current value refers to the fact that the current from the battery rack 100 does not properly flow to the single discharge path by the internal load 340, but flows to the main/sub discharge path by the main contactor 310 and pre-charge contactor 320, so that when such a state is detected, it is determined that the internal load 340 is damaged and the contactors 310 and 330 are fused.

In the third discharge condition determination step, it is determined that the third discharge condition is satisfied if it is determined that there is no damage to the internal load 340 and no fusion of the contactors 310 and 320 through the method described above, and it is possible to output a third satisfaction signal indicating this (third discharge condition determination unit, 260).

On the other hand, if it is determined that the current battery rack 100 does not meet the third discharge condition, it returns to the abnormal situation detection step S400.

2.6. Second Operation Mode Operation Step S700

The second operation mode operation step is a step that is considered to be a state in which all of the first, second and third discharge conditions corresponding to a single discharge condition are satisfied if it is determined in the third discharge condition determination step S600 that the current battery rack satisfies the third discharge condition among single discharge conditions, and by connecting the battery rack 100 to the internal load 340 while separating it from the external load, the battery rack is switched to operate in a second operation mode in which the battery rack is discharged independently by a first internal load charged/discharged by an external load.

As shown in FIG. 3, this may be achieved as separating the battery rack 100 from an external load and forming the single discharge path d by an internal load through controlling both the main contactor 310 and the pre-charge contactor 320 to be open so as to close the main discharge path a and the sub discharge path b from the battery rack 100 to the external load and place the switch 350 at the first terminal which is one end of the internal load 340.

Accordingly, the battery rack 100 discharges itself to the internal load 340 through the single discharge path d without dependence on the external load, thereby solving abnormal situations including an overcharge state, a deviation between racks, and the like.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A system for discharging a plurality of battery racks that discharges each battery rack individually, the system comprising:
the plurality of battery racks connected in parallel;
a battery management system (BMS) provided for each of the battery racks, the BMS being configured to:
sequentially determine whether or not a predetermined single discharge condition is satisfied when it is detected that an abnormal situation occurs in the corresponding battery rack; and
control the corresponding battery rack to operate independently according to the determination result; and
a battery protection unit (BPU) provided for each of the battery racks, the BPU being configured to switch the corresponding battery rack from connection with an external load to a connection with an internal load under the control of the BMS to perform an independent discharge operation by the internal load.

2. The system of claim 1, wherein the BPU comprises:
a main contactor connected between the battery rack and a DC Link plus (+) terminal connected to the external load to form a main discharge path from the battery racks to the external load;
a pre-charge contactor having a pre-charge resistor of a predetermined size connected in series and connected in parallel to the main contactor to form a sub discharge path from the battery rack to the external load;
a current sensor connected in series to the main contactor and the pre-charge contactor to sense a magnitude of current flowing from the battery rack through the main discharge path and the sub discharge path;
the internal load having one end connected in parallel to the main contactor, and another end formed with a first terminal connected to a charging path from the external load to the battery rack, the internal load being configured to consume current discharged from the battery rack according to a connection state of the first terminal; and
a switch located at the first terminal from a second terminal on the charging path under a control of the BMS to form a single discharge path from the battery rack to the internal load.

3. The system of claim 2, wherein the battery management system (BMS) comprises:
a rack voltage measurement unit configured to measure a voltage of the battery rack at regular intervals;
a communication unit configured to connect communication with the battery management system BMS of another battery rack;
an abnormal situation detection unit configured to detect whether an abnormal situation requiring discharging of the battery rack occurs, based on a rack voltage measured by the rack voltage measurement unit and another rack voltage of other battery racks received through the communication unit;
a first discharge condition determination unit configured to determine whether a current battery rack satisfies a first discharge condition, among predetermined single discharge conditions, when it is detected that an abnormal situation occurs by the abnormal situation detection unit;
a second discharge condition determination unit configured to determine whether a current battery rack satisfies a second discharge condition, among the predetermined single discharge conditions, when the first discharge condition determination unit determines that the first discharge condition is satisfied;
a third discharge condition determination unit configured to determine whether a current battery rack satisfies a third discharge condition, among the predetermined single discharge conditions, when the second discharge condition determination unit determines that the second discharge condition is satisfied; and
a connection state control unit configured to control a connection state of the main contactor, the pre-charge contactor, and a switch, so that the battery rack is separated from the external load and is connected to the internal load when the third discharge condition determination unit determines that a third discharge condition is satisfied.

4. The system of claim 3, wherein the first discharge condition determination unit comprises:
a voltage abnormality detection unit configured to:
detect whether a rack voltage measured by the rack voltage measurement unit is equal to or higher than a predetermined voltage abnormality reference value; and
output a voltage abnormality signal indicating that the rack voltage is equal to or higher than the predetermined voltage abnormality reference value;
a voltage abnormality duration time measurement unit configured to measure a duration time of a voltage abnormality state from a time point when a voltage abnormality signal is outputted from the voltage abnormality detection unit; and
a voltage abnormality continuity determination unit configured to:
compare whether the duration time of the voltage abnormality state, measured by the voltage abnormality duration time measurement unit, is equal to or higher than a predetermined duration time reference value; and
if the duration time is equal to or higher than the predetermined duration time reference value, output a first satisfaction signal indicating that the current battery rack satisfies the first discharge condition.

5. The system of claim 3, wherein the connection state control unit is further configured to:
sequentially control the pre-charge contactor and the main contactor to be in a closed state; and
position the switch at the second terminal to connect the battery rack with the external load in a first operation mode state in which the battery rack is charged or discharged by the external load.

6. The system of claim 5, wherein, if the third discharge condition determination unit determines that the third discharge condition is satisfied, the connection state control unit is further configured to:
control both the pre-charge contactor and the main contactor to be in an open state; and
position the switch at the first terminal to form a single discharge path to the internal load, while separating the battery rack from the external load.

7. The system of claim 3, wherein the second discharge condition in the second discharge condition determination unit is a state in which the current battery rack is not charged or discharged by the external load.

8. The system of claim 3, wherein the third discharge condition in the third discharge condition determination unit comprises a state in which:

there is no damage to the internal load; and
there is no fusion of the main contactor and the pre-charge contactor.

9. An individual discharge method of a battery rack in a system according to claim 1, the method comprising:
a communication connection operation of connecting communication for data exchange with another battery rack connected in parallel;
a first operation mode operation operation in which the battery rack:
is connected to the external load; and
operates in a first operation mode in which charging or discharging is performed by the external load;
a rack voltage measurement operation of measuring a voltage of the battery rack at regular intervals;
an abnormal situation detection operation of detecting whether an abnormal situation requiring discharge occurs in the corresponding battery rack, based on rack voltage data measured in the rack voltage measurement operation and rack voltage data of the other battery rack connected to the communication;
a single discharge condition satisfaction determination operation of determining whether the current battery rack satisfies a predetermined single discharge condition for operating in a second operation mode in which the current battery rack discharges alone by an internal load when it is detected that an abnormal situation occurs in the battery rack in the abnormal situation detection operation; and
a second operation mode operation operation of switching the battery rack to a second operation mode in which the battery rack discharges independently by the internal load if it is determined that the current battery rack satisfies the single discharge condition through the single discharge condition satisfaction determination operation.

10. The method of claim 9, wherein the single discharge satisfaction determination operation comprises:
a first discharge condition determination operation of determining whether the current battery rack satisfies a first discharge condition, among predetermined single discharge conditions;
a second discharge condition determination operation of determining whether the battery rack satisfies a second discharge condition, among the predetermined single discharge conditions when it is determined that the first discharge condition is satisfied; and
a third discharge condition determination operation of determining whether the battery rack satisfies a third discharge condition, among the predetermined single discharge conditions when it is determined that the second discharge condition is satisfied.

11. The method of claim 10, wherein the first discharge condition determination operation comprises:
a voltage abnormality detection operation of detecting whether a rack voltage measured in the rack voltage measurement operation is equal to or higher than a predetermined voltage abnormality reference value;
a voltage abnormality duration time measurement operation of measuring a duration time of a voltage abnormality state from a time point detected in the voltage abnormality detection operation; and
a voltage abnormality duration determination operation of:
comparing whether the voltage abnormality duration time measured in the voltage abnormality duration time measurement operation is equal to or more than a predetermined duration time reference value; and
determining that the current battery rack satisfies the first discharge condition, among the predetermined single discharge conditions, if the voltage abnormality duration time is equal to or higher than the predetermined duration time reference value.

12. The method of claim 9, wherein the first operation mode operation operation:
controls the pre-charge contactor and the main contactor to be in a closed state to form a sub discharge path and a main discharge path from the battery rack to an external load; and
locates the switch at the second terminal to form a charging path from the external load to the battery rack.

13. The method of claim 12, wherein the second operation mode operation operation:
switches the pre-charge contactor and the main contactor to an open state to close the sub discharge path and the main discharge path; and
separates the battery rack from an external load by placing the switch at the first terminal to form a single discharge path from the battery rack to the internal load.

14. The method of claim 10, wherein the second discharge condition in the second discharge condition determination operation is a state in which the current battery rack has no charge or discharge operation due to an external load.

15. The method of claim 10, wherein the third discharge condition in the third discharge condition determination operation comprises a state in which:
there is no damage to the internal load; and
there is no fusion between the main contactor and the pre-charge contactor.

* * * * *